Jan. 1, 1957 C. B. RICHEY 2,775,855
TRACTOR MOUNTED RECIPROCATING CUTTING ASSEMBLY
Filed Aug. 25, 1952 3 Sheets-Sheet 1

INVENTOR.
CLARENCE B. RICHEY
BY Carlson, Pitzner,
Hubbard + Wolfe
ATTORNEYS.

Jan. 1, 1957 C. B. RICHEY 2,775,855
TRACTOR MOUNTED RECIPROCATING CUTTING ASSEMBLY
Filed Aug. 25, 1952 3 Sheets-Sheet 2

INVENTOR.
CLARENCE B. RICHEY
BY Carlson, Pitzner,
Hubbard & Wolfe
ATTORNEYS.

INVENTOR.
CLARENCE B. RICHEY
BY Carlson, Pitzner, Hubbard & Wolfe
ATTORNEYS.

United States Patent Office 2,775,855
Patented Jan. 1, 1957

2,775,855

TRACTOR MOUNTED RECIPROCATING CUTTING ASSEMBLY

Clarence B. Richey, Royal Oak, Mich., assignor to Harry Ferguson, Inc., Detroit, Mich., a corporation of Delaware Application August 25, 1952, Serial No. 306,081

9 Claims. (Cl. 56—25)

The present invention pertains generally to mowing machines and more particularly to mowers in the form of attachments for tractors, although in some of its broader aspects the invention is applicable to still other types of tractor drawn implements or attachments.

It is a general aim of the present invention to provide a rugged, effective mower attachment for tractors and which is of simplified, low-cost construction, such attachment having a mower-lifting mechanism adapted to utilize operating power derived from the tractor.

In another aspect, it is an object of the invention to provide an improved supporting structure for mounting implements on a tractor in such manner as to be readily attachable and detachable.

A further object is to provide a mower attachment for tractors which embodies an improved supporting structure of rugged yet simple and low-cost construction.

Another object is to provide a mower for use with a tractor having a power-operated draft linkage incorporating a simplified, improved cutter-lifting mechanism operable by the draft linkage.

It is still another object to provide a tractor-driven mower incorporating a simplified yet reliable arrangement for interrupting the operation of the cutting mechanism when an obstruction is encountered.

Further objects and advantages of the invention will become apparent as the following description proceeds, taken in connection with the accompanying drawings in which.

Figure 1:
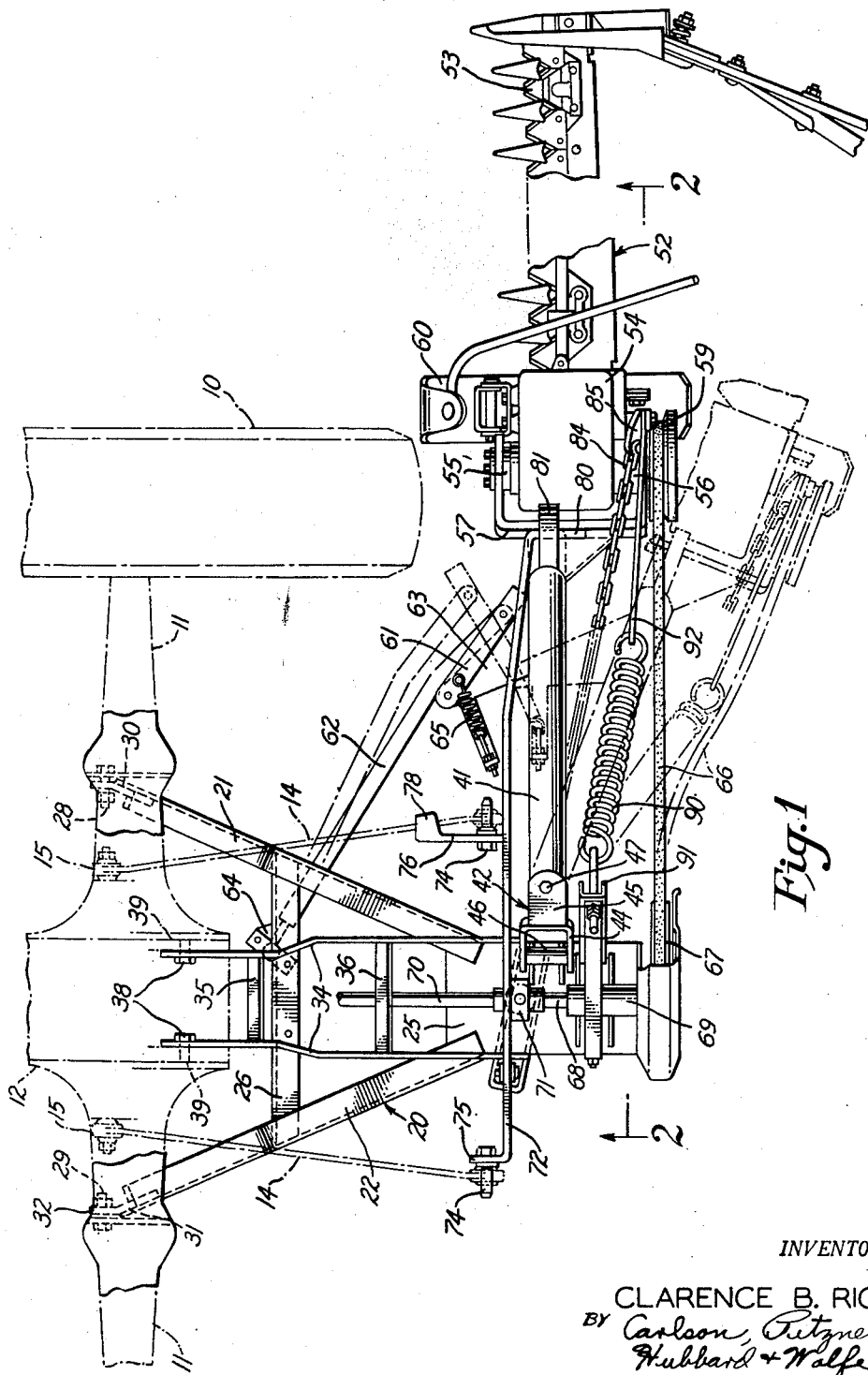
Figure 1 is a fragmentary plan view with parts broken away of an illustrative mower attachment embodying the present invention, the attachment being shown as applied to a tractor, the rear end portion of which is indicated in dot-dash outline.

While the invention is susceptible of various modifications and alternative constructions, there is shown in the drawings and will herein be described in detail a preferred embodiment, but it is to be understood that it is not thereby intended to limit the invention to the form disclosed, but it is intended to cover all modifications and alternative constructions falling within the spirit and scope of the invention as expressed in the appended claims.

Referring more particularly to the drawings, the invention is there illustrated as embodied in a novel mower attachment applied to a tractor, the rear end portion of which appears in dot-dash outline in Fig. 1. Although the drawings show a portion of the well-known "Ferguson" tractor, this is simply illustrative of one of a variety of tractors to which the present implement may be applied.

As a preliminary to a consideration of the implement itself, the illustrated portions of the tractor to which it is shown attached may be briefly identified. Referring to Fig. 1, it will be noted that the tractor has pneumatic tired rear wheels 10 situated at the outer ends of rear axle housings 11 which extend laterally from a central differential housing 12. Trailing from the rear end portion of the tractor is a pair of laterally spaced draft links 14 connected to the differential housing by universal pivots 15 located below and slightly forward of the axis of the housings 11. For the purpose of raising and lowering the draft links, the tractor is provided with a power lift device, which may, for example, be of the type disclosed and claimed in Henry George Ferguson United States Patent No. 2,118,180, issued May 24, 1938.

Figure 4:
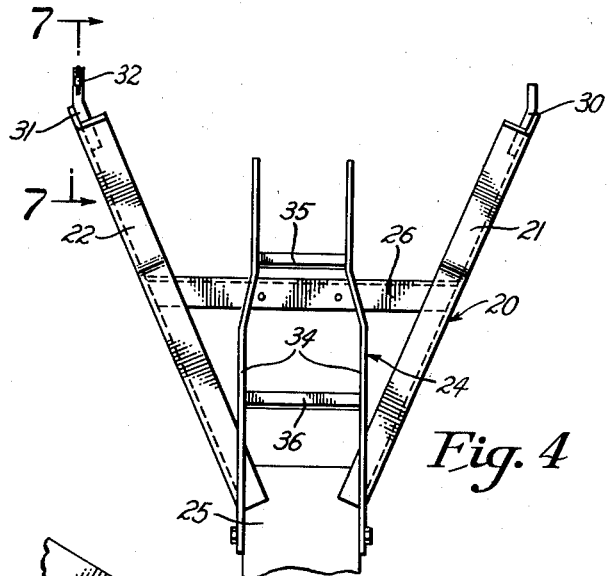
Fig. 4 is a fragmentary plan view showing a tripod supporting structure forming a part of the mower.
Figure 5:
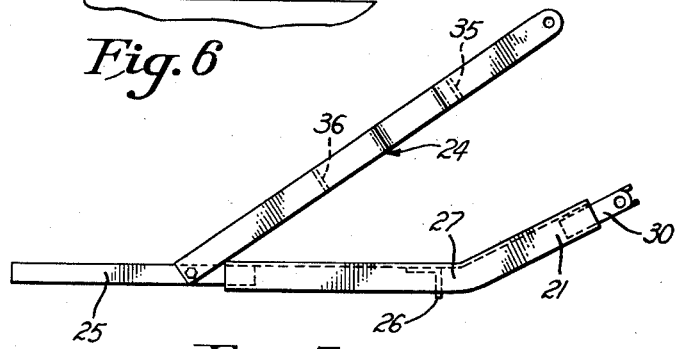
Fig. 5 is a side elevational view of the tripod structure.

Provision is made for detachably mounting the mower on the tractor by means of a supporting structure in the form of a tripod mounting frame 20. In this instance, the frame 20 comprises a pair of lower legs 21 and 22, together with an upper leg 24 (Figs. 4 and 5). At their trailing ends, the three legs are rigidly secured to a flanged, generally horizontal plate 25. Forwardly of the plate, the legs mutually diverge for attachment to the tractor at spaced points. Optionally, a cross member 26 may be connected between the diverging lower legs 21 and 22, to enhance the rigidity of the tripod frame. The lower legs have downwardly offset or bent portions 27 passing under the draft links 14 so as to avoid interference with the movement thereof.

Figure 7:
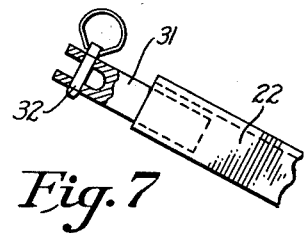
Fig. 7 is a fragmentary sectional view taken generally along the line 7—7 in Fig. 4.

The front ends of the lower tripod legs 21 and 22 are detachably connected to the tractor by means including in this instance, a pair of pins 28 and 29 (Fig. 1) mounted on the underside of the axle housings 11. At its front end, one tripod leg 21 is provided with an apertured connecting member 30 adapted to slide laterally onto the pin 28. The other tripod leg 22 has a bifurcated connecting member 31 (Fig. 7) adapted to slide forwardly over the pin 29. The member 31 is secured on the pin 29 by inserting a pin 32 vertically through suitable apertures in the front end portions of the bifurcated member.

In this instance, the upper leg 24 of the tripod frame 20 includes a pair of generally parallel runners 34 bolted to the flanges of the plate 25 and braced by cross members 35 and 36. The runners 34 are inclined upwardly for attachment at their upper ends to the differential housing 12 by means of suitable pins 38, which extend into apertured flanges 39 thereon.

The tripod frame 20 serves as a rigid support for the inner end of a laterally extending drag bar 41 (see also Figs. 2 and 3) which is connected to the frame plate 25 for upward and rearward swinging movement, as by means of a universal joint 42. As illustrated, the universal joint comprises a pair of rigidly joined horizontal and vertical clevises 44 and 45 spanned by generally horizontal and vertical pivot pins 46 and 47 which are connected respectively to brackets 49 on the plate 25 and to the inner end of the dragbar 41.

Pivoted to the outer end of the dragbar 41 is a laterally extending mower bar 52 having a cutting knife 53 reciprocable by a driving head 54 rigidly connected to the inner end of the mower bar. The driving head is suspended on front and rear pivots 55 and 56 between the arms of a yoke 57 on the outer end of the dragbar. A drive shaft 58 for the driving head extends axially through the rear pivot 56, and a pulley 59 is mounted on the shaft. A ground shoe 60 is mounted on the driving head 54.

Housed within the driving head 54 is a suitable crank or cam-type cutter operating mechanism (not shown) for converting the rotary motion of the pulley into reciprocatory motion. Since the present invention is not concerned with the particulars of such mechanism, the latter need not be described or illustrated here in further detail.

Figure 6:
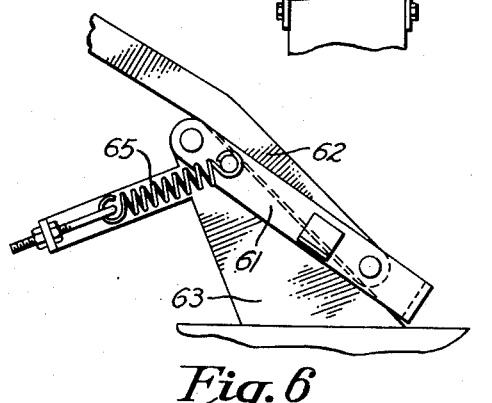
Fig. 6 is an enlarged fragmentary plan view illustrating a portion of a break-out mechanism incorporated in the mower.

Provision is made for holding the mower bar in its normal laterally extending position generally perpendicular to the direction of draft, as shown in full lines in Fig. 1. This is accomplished by means of a releasable break-out connection adapted to give way when the mower bar encounters a fixed obstruction such as a stump or a rock. In the resulting break-out action the dragbar 41 and the mower bar 52 swing rearwardly as a unit about the universal joint 42, as shown in dotted lines in Fig. 1. In this instance the releasable connection includes a toggle link 61 (Figs. 1 and 6) connected between an elongated break-out link 62 and a bracket 63 mounted on the dragbar 41 adjacent its outer end. The forward end of the break-out link 62 has a ball and socket connection 64 to a point which is fixed relative to the tractor. Conveniently, the connection may be made to the cross member 26 on the tripod frame 20. The toggle link 61 is urged into its jacknifed position, shown in full lines in Fig. 1, by means of a spring 65 connected at one end to an intermediate point on the link 61 and adjustably anchored at its other end to the bracket 63.

Should the mower bar 52 hit an obstruction offering sufficient resistance to overcome the spring 65, the break-out links 61 and 62 are unfolded, as indicated in dotted lines in Fig. 1, and the mower bar and the dragbar 41 are permitted to swing rearwardly on the universal joint 42. The degree of rearward swing, while limited by the extended length of the links 61 and 62, is ample to permit the driver to halt the tractor without damage to the mower attachment.

The mower bar 52 is driven from the tractor by means of a driving mechanism which is constructed so as to interrupt the operation of the mower bar when break-out occurs. In this instance, the pulley 59 on the driving head 54 is driven by means of a V-belt 66 trained around a pulley 67. The latter is mounted rearwardly of the dragbar 41 on a generally horizontal shaft 68 journaled in a bearing 69. The frame plate 25 on the tripod structure 20 supports the bearing 69 in a fixed relationship to the tractor. A power take-off shaft 70, driven by a power take-off mechanism (not shown) on the tractor, is connected to the shaft 68 by means of a universal joint 71.

Break-out automatically interrupts the transmission of power to the mower bar 52, independently of continued operation of the power take-off mechanism on the tractor. When the dragbar 41 and the cutter driving head 54 swing rearwardly, the pulley 59 moves closer to the pulley 67, because of the laterally and rearwardly eccentric positions of the pulleys, especially the pulley 67, with respect to the universal joint 42. As a result, the V-belt 66 is loosened and thus rendered incapable of transmitting power to the driving head 54.

Figure 2:
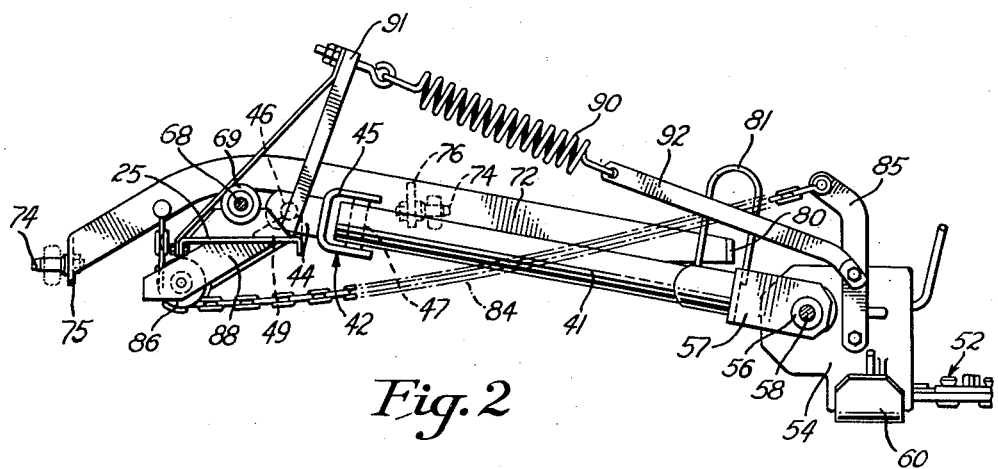
Fig. 2 is a vertical section of the mower taken from the rear, generally along the line 2—2 in Fig. 1, the mower being shown with its mower bar lowered into operative position.
Figure 3:
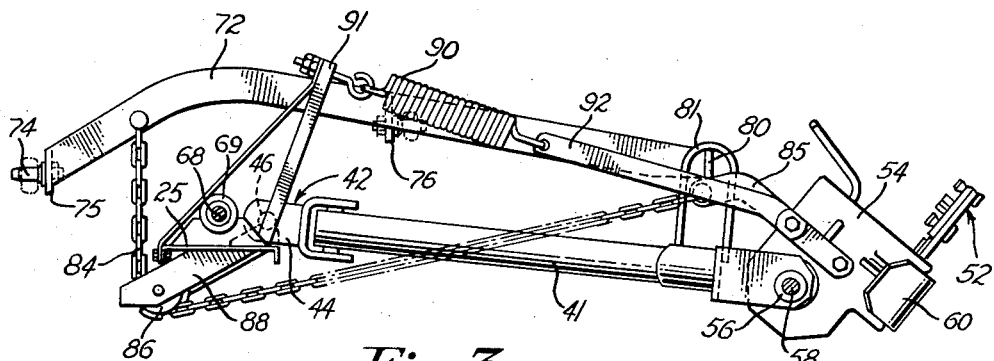
Fig. 3 is a view similar to Fig. 2, but in this instance the mower bar is shown in an elevated position.

By means now to be described, the mower bar 52 and the dragbar 41 may be swung upwardly on their respective pivots by operating the power lift device on the tractor so as to raise the draft links 14. For this purpose, the exemplary implement has a lifting mechanism including a lift bar 72 spanning the outer ends of the draft links and having one end overhanging the latter so as to extend into proximity with the outboard end of the dragbar 41. The lift bar 72 is adapted to be attached to the draft links by means of link pins 74 extending through forwardly projecting lugs 75 and 76 on the bar 72 (Figs. 1, 2 and 3). The lug 76 is elongated and provided with a hooked outer end portion 78 engaging the underside of the right hand draft link so as to stabilize the bar 72 against rotation on the pins 74. In order that the mower bar may be free to follow normal variations in ground contour, a lost motion connection is provided between the lift bar 72 and the dragbar 41. In this case the overhanging end of the lift bar 72 is bent rearwardly to form an arm 80, which projects through a vertically elongated eye formed by an inverted U-shaped member 81 (Fig. 2) rigidly mounted on the upper side of the dragbar 41. By means of the lift bar 72 and the U-shaped member 81, a lifting effort is exerted on the outer end of the dragbar 41 when the draft links are raised a sufficient distance to bring the arm 80 into engagement with the upper portion of the U-shaped member 81.

In order to utilize power derived from the tractor for swinging the mower bar 52 upwardly on its pivots, the draft links 14 are connected to the mower bar by means of a lost motion connecting arrangement, including a flexible line or pull chain 84 secured at its outer end to an upwardly projecting arm 85 mounted on the cutter driving head 54. The chain extends laterally from the arm 85 and then upwardly around a sheave 86 journaled in depending brackets 88 mounted on the frameplate 25. At its inner end, the chain is secured to the lift bar 72 at an intermediate point.

When the mower bar 52 and the dragbar 41 are in their operating positions, a portion of their weight is sustained by a strong counterbalancing spring 90 connected at one end to a bracket 91 on the frame plate 25 and at the other end to a link bar 92 secured to the arm 85 at an intermediate point. While the spring 90 exerts sufficient lift to facilitate passage of the mower bar 52 over minor obstructions, the remaining weight component of the members 41, 52 not counterbalanced by spring 90 is sufficiently great to insure continuous contact between the ground shoe 60 and the ground as long as the mower bar 52 is in its working position.

The operation of the disclosed implement will in general be clear from the foregoing. By way of brief recapitulation, it may be assumed initially that the implement is in its normal operating position with the mower bar lowered and the break-out linkage folded, as shown in full lines in Figs. 1 and 2. To initiate reciprocation of the knife 53, the driver energizes the power take-off unit on the tractor so as to rotate the shaft 70. The belt 66, being under normal tension, transmits power from the pulley 67 to the cutter driving pulley 59. As the tractor is driven forward, the mower attachment is hauled along, carrying on the mowing operation in the usual manner. While the implement is in its working position, a large portion of its weight is borne by the tripod supporting structure 20, through the medium of the dragbar 41 and the counterbalancing spring 90. However, the mower bar 52 rests upon and glides along the ground. The lost motion connection between the hoist mechanism and the mower bar permits the latter to rise and fall through a large angle in conformity with changes in ground contour. This is especially useful in mowing along slopes which either rise from or fall away from the side of the tractor.

Break-out occurs in the event that the mower bar encounters a sizable obstruction. The break-out links 61 and 62 are forced to unfold and the mower bar swings rearwardly about the joint 42. As a result the belt 66 is loosened, so that the operation of the mower bar is discontinued.

After break-out, the driver backs up the tractor to retreat from the obstruction and restore the mower to its normal condition. Since the mower bar does not slide very easily along the ground in a rearward direction, it is swung forwardly about the universal joint 42 so as to fold the break-out links 61 and 62. Simultaneously the belt 66 is tightened, thus reestablishing the driving connection between the tractor and the mower.

The mower is then raised to clear the obstruction by actuating the power lift device on the tractor to swing up the draft links 14. Bodily upward movement of the lift bar 72 is thus effected, along with tensioning of the chain 84 and upward swinging movement of the mower bar 52 about its pivot at 58, as shown in Fig. 3. After a certain amount of lost motion, the rearward arm 80 on the lift bar engages the upper end of the U-shaped member 81 and swings the dragbar 41 upwardly about the pivot connection provided by the universal joint 42. In this way, the mower is elevated sufficiently to clear almost any obstruction normally encountered in the field. The tractor operator need only cause slight upward travel of the draft links 14 in order to swing the mower bar 52 upwardly, while continued elevation of the draft links swings the dragbar 41, and the mower bar with it, upwardly about the inner end of the dragbar. By this simple operation the operating angle of the mower bar 52 may be controlled, or the entire mower raised to transport position, i. e., clear of the ground.

When the tractor is to be driven through gates or along roads from one working location to another, the mower bar 52 may be swung up manually into an inwardly leaning, generally upright position, so that the mower does not add substantially to the width of the tractor. To resume mowing, the operator need only swing the mower bar back down until the chain 84 holds it relative to the dragbar, and then lower the draft links by manipulating the lift device on the tractor.

It is a simple matter to disconnect the implement from the tractor. This is accomplished merely by removing the pins 74 at the rear ends of the draft links, the pins 28 and 29 at the front end of the lower tripod legs 21 and 22, and the pins 38 at the front ends of the runners 34. Conversely, the implement may be attached to the tractor with speed and facility by reversing the foregoing procedure.

I claim as my invention:

1. An agricultural attachment for a tractor having an axle housing and having trailingly pivoted, vertically swingable draft links arranged in rearwardly diverging relation thereon, said attachment comprising, in combination, three rearwardly converging tripod legs, frame means interconnecting the rear ends of the legs, two of the legs having means at their forward ends for connecting the same to the tractor axle housing and being offset downwardly rearwardly of the points of connection to permit the respective draft links to pass thereover and to move upwardly and downwardly relative thereto, means for detachably connecting the front ends of the third leg to the tractor in a central location adjacent the top of the axle housing, an agricultural implement supported on and carried by the frame means and having a positionable component thereon, and means including a force transmitting element interconnected between the draft links and the component to position the latter in response to elevational movement of the draft links.

2. An agricultural attachment for a tractor having an axle housing and having rearwardly extending draft links vertically swingable by power means on the tractor, said attachment comprising, in combination, a pair of lower tripod legs diverging forwardly, said legs having means at their forward ends for connection to the tractor axle housing, said legs being offset downwardly to permit the respective draft links to pass thereover with clearance to enable up-and-down movement of the links, a cross member spanning the lower legs at a point intermediate their ends, an upwardly inclined upper tripod leg having a pair of side runners and a cross member spanning the runners, a rigid frame member interconnecting the rearward ends of the tripod legs, means for detachably connecting the upper tripod leg to a point on the tractor between and above the points of connection of the lower legs, an agricultural implement mounted on the frame member and having a positionable component, and means including a force-transmitting member operatively interconnected between the draft links and the component to position the latter in response to movement of the draft links.

3. In a mower attachment for a tractor having an axle housing and a pair of laterally spaced draft links trailingly pivoted thereon for operation by a power lift device on the tractor, the combination comprising a tripod frame having an apex member and three legs mutually diverging forwardly therefrom including two lower legs and an upper leg, means for rigidly and detachably connecting the two lower legs to the tractor at spaced points along the axle housing with the apex member spaced rearwardly from the tractor, said lower legs being vertically offset from the tractor draft links so that the draft links are free for normally vertical movement, said upper leg having means for connecting the same adjacent the top of the axle housing and spaced between the points of connection of the lower links, a laterally extending mower, and means pivotally connecting the same to the apex member for swinging movement in a vertical plane, a lift bar, means on the lift bar for disengageably connecting the same to the rear ends of the draft links for elevation therewith, and a member connected to the lift bar and to the mower at a point spaced laterally from the apex member to raise the mower about its pivot connection with said apex member upon upward movement of the draft links.

4. In a mower attachment for a tractor having a power take-off device and a pair of laterally spaced draft links trailingly pivoted thereon for vertical movement by a power lift device on the tractor, the combination comprising a tripod frame having three mutually and forwardly diverging legs, means for rigidly and detachably connecting the frame to the rear portion of the tractor while leaving the draft links free for vertical movement, a mower and means pivotally connecting the same to the frame for vertical and rearward movement, releasable break-out means interposed between the frame and the mower for yieldably holding the mower in a position extending laterally of the tractor, a drive pulley mounted on the frame and located rearwardly of the mower, a second pulley mounted laterally of the drive pulley on the mower for operating the same, a removable shaft drivingly interposed between the drive pulley and the power take-off device, a belt looped around the pulleys forming a driving connection therebetween disengageable by rearward movement of the mower, a lift member connected to the mower, and means for detachably connecting the lift member to the draft links for lifting the mower about its pivot connection to the frame by operation of the lift device.

5. In a mower attachment for a tractor of the type having a power take-off device and a pair of trailingly pivoted draft links elevatable by a power lift device, the combination comprising a tripod frame having three mutually and forwardly diverging legs adapted to be fixedly attached at their front ends to the tractor and a frame member interconnecting the rearward ends of the legs, said tripod legs being constructed and arranged to leave the draft links free for normal movement, a mower bar, means including a pivot connecting the mower bar to the frame for supporting the mower bar laterally of the tractor with freedom for rearward swinging movement, releasable break-out means interconnected between said frame and a point on said mower bar spaced laterally from said pivot for holding the mower bar in a laterally extending position, a bearing mounted on the frame member, a fore-and-aft shaft journaled in the bearing and adapted to be connected to the power take-off device on the tractor, a first pulley on the shaft spaced rearwardly of the pivot, means for driving the mower bar including a second pulley carried thereon at a point spaced laterally from the first pulley, a belt looped around said pulleys and forming a driving connection therebetween disengageable by loosening of the belt upon rearward swinging movement of the second pulley with the mower bar, and means interconnected between the draft links and a point on the mower spaced laterally from a pivot for rocking the mower bar upwardly when the draft links are raised by the power lift device.

6. In a mower attachment for a tractor of the type having a power take-off device and a rear hitch including elevatable draft links, the combination comprising a mounting frame, means for rigidly and detachably securing the frame in laterally centered, rearwardly extending relation to the tractor, a mower bar, a laterally extending dragbar connected at one end to the frame and at the other end to the mower bar, means including a first pulley on the mower bar for operating the same, a second pulley on the frame, means for connecting the second pulley to the power take-off device, a belt looped around the pulleys, a joint in the dragbar arranged to allow both rearward and vertical swinging movement of the dragbar and mower bar, releasable break-out means interposed between the frame and the dragbar for yieldably holding the dragbar in a laterally extending position, a transverse lift bar adapted for connection to the tractor's draft links, and means connecting said lift bar to said dragbar to effect upward vertical swing thereof upon elevation of the draft links, the joint in said dragbar being positioned between the frame pulley and the second pulley so as to effect loosening of the belt upon horizontal rearward movement of the dragbar.

7. In a mower attachment for a tractor having a pair of laterally spaced draft links trailingly pivoted thereon for vertical movement by a power lift device on the tractor, the combination comprising a mounting frame, means for rigidly and detachably connecting the frame to the rear portion of the tractor, a dragbar pivoted at its inner end to the frame for swinging movement in a vertical plane, a mower bar pivoted to the outer end of the dragbar for vertical swinging movement, a laterally extending lift bar, means for detachably connecting the lift bar to the rear ends of the draft links, a member interconnecting the lift bar and the dragbar at a point spaced from its inner end for lifting the latter, an upwardly projecting arm on the mower bar, a sheave on the mounting frame, and a flexible line trained under the sheave and attached at its opposite ends to the lift bar and the arm for swinging the mower bar upwardly by operation of the power lift device, whereby elevation of said draft links first swings said mower bar upwardly relative to said dragbar and then swings both said dragbar and mower bar upwardly relative to said frame.

8. In a mower attachment for a tractor having a pair of laterally spaced draft links trailingly pivoted thereon for vertical movement by a power lift device on the tractor, the combination comprising a mounting frame, means for detachably connecting the frame to the rear portion of the tractor, a dragbar extending laterally from the frame and pivoted thereon for swinging movement in a vertical plane, a mower bar pivoted to the outer end of the dragbar for vertical swinging movement, an upwardly extending arm on the mower bar, a pulley mounted on the frame, a laterally extending lift bar, means for detachably connecting the lift bar to the rear ends of the draft links, a flexible line trained around the pulley and connected at its opposite ends to the arm and the lift bar for lifting the mower bar upon upward movement of the draft links, and a lost motion member mounted on the dragbar and having an eye hooked over the lift bar for lifting the dragbar by operation of the power lift device.

9. In a mower attachment for a tractor having a pair of laterally spaced draft links trailingly pivoted thereon for vertical movement by a power lift device on the tractor, the combination comprising, a rigid mounting frame, means for fixedly and detachably connecting the mounting frame to the tractor, a dragbar pivoted to the frame for horizontally rearward swinging movement, releasable break-out means interposed between the frame and the dragbar for yieldably holding the latter in a laterally extending position, a mower bar pivoted to the outer end of the dragbar for swinging movement in a vertical plane, a laterally extending lift bar having a rearwardly projecting ram, means for detachably connecting the lift bar to the rear end of the draft links, a lift member on the dragbar having an eye for withdrawably receiving the arm on the lift bar, a sheave mounted on the frame, and a flexible line trained around the sheave and connected at its opposite ends to the lift bar and the mower bar for swinging the latter upwardly in response to elevation of the draft links by operation of the power lift device.

References Cited in the file of this patent

UNITED STATES PATENTS

| | | |
|---|---|---|
| 1,453,059 | Blass | Apr. 24, 1923 |
| 1,499,669 | Krueger | July 1, 1924 |
| 1,646,519 | Baseman | Oct. 25, 1927 |
| 1,682,313 | Turner | Aug. 28, 1928 |
| 1,745,069 | Wallace et al. | Jan. 28, 1930 |
| 1,911,388 | Pearson | May 30, 1933 |
| 2,172,987 | Mott | Sept. 12, 1939 |
| 2,354,710 | Simpson et al. | Aug. 1, 1944 |
| 2,375,912 | Gifford et al. | May 15, 1945 |
| 2,454,684 | Acton | Nov. 23, 1948 |
| 2,533,804 | Hitchcock | Dec. 12, 1950 |
| 2,550,412 | Girardi | Apr. 24, 1951 |